(12) United States Patent
Nguyen et al.

(10) Patent No.: US 9,654,318 B2
(45) Date of Patent: May 16, 2017

(54) APPARATUS AND METHOD FOR SWITCHING BETWEEN RECEIVERS IN COMMUNICATION SYSTEM

(71) Applicant: Samsung Electronics Co., Ltd., Gyeonggi-do (KR)

(72) Inventors: Minh Viet Nguyen, Gyeonggi-do (KR); Sai Subramany Amthoota, Bangalore (IN); Kwang-Chul Kim, Gyeonggi-do (KR); Hun-Kee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/625,163

(22) Filed: Feb. 18, 2015

(65) Prior Publication Data

US 2016/0149734 A1 May 26, 2016

(51) Int. Cl.
*H04L 1/00* (2006.01)
*H04L 27/00* (2006.01)
*H04L 27/22* (2006.01)
*H04L 27/233* (2006.01)
*H04J 11/00* (2006.01)
*H04L 27/20* (2006.01)

(52) U.S. Cl.
CPC ...... *H04L 27/0008* (2013.01); *H04J 11/0046* (2013.01); *H04L 1/0036* (2013.01); *H04L 27/22* (2013.01); *H04L 27/2334* (2013.01); *H04L 27/0012* (2013.01); *H04L 27/2017* (2013.01); *H04L 27/2089* (2013.01)

(58) Field of Classification Search
CPC . H04L 27/0012; H04L 27/22; H04L 27/2334; H04L 1/0036
See application file for complete search history.

(56) References Cited

U.S. PATENT DOCUMENTS

| | | | | |
|---|---|---|---|---|
| 4,488,154 | A * | 12/1984 | Ward | G01S 13/5248 342/162 |
| 7,006,811 | B2 * | 2/2006 | Pukkila | H04L 25/0212 375/346 |
| 7,110,927 | B1 * | 9/2006 | San | G06F 17/5054 703/13 |
| 8,068,539 | B2 * | 11/2011 | Molev-Shteiman | H04L 25/03038 375/232 |
| 8,260,610 | B2 | 9/2012 | Juncker et al. | |
| 8,682,251 | B2 | 3/2014 | Das et al. | |
| 8,767,895 | B2 * | 7/2014 | Reial | H04B 1/123 375/144 |

(Continued)

OTHER PUBLICATIONS

3GPP TSG GERAN #43, Aug. 31-Sep. 4, 2009, Vancouver Canada, Source: Nokia Corporation, Impact of DTX on VAMOS Level 2 Terminal Performance, pp. 6.

(Continued)

*Primary Examiner* — Jean B Corrielus
(74) *Attorney, Agent, or Firm* — The Farrell Law Firm, P.C.

(57) ABSTRACT

An apparatus for switching between receivers according to a characteristic of a received signal in a communication system includes a radio frequency unit that modulates at least two signals received from transmission devices, and a Channel Impulse Response (CIR) shape comparison unit that determines characteristics of the modulated signals by using a CIR and selects a receiver according to the determined characteristics of the modulated signals.

16 Claims, 7 Drawing Sheets

(56) References Cited

U.S. PATENT DOCUMENTS

| | | | | |
|---|---|---|---|---|
| 8,786,472 | B1* | 7/2014 | Prince | H03M 7/00 |
| | | | | 341/123 |
| 8,995,589 | B1* | 3/2015 | Qiu | H03L 7/099 |
| | | | | 375/316 |
| 2006/0234633 | A1* | 10/2006 | Huss | H04B 1/1027 |
| | | | | 455/63.1 |
| 2008/0130771 | A1* | 6/2008 | Fechtel | H04L 25/0212 |
| | | | | 375/260 |
| 2008/0310493 | A1* | 12/2008 | Cohen | H04L 25/03114 |
| | | | | 375/232 |
| 2009/0304122 | A1* | 12/2009 | Fatemi-Ghomi | H04L 25/0212 |
| | | | | 375/341 |
| 2013/0308733 | A1* | 11/2013 | Kato | H04L 25/0212 |
| | | | | 375/346 |
| 2014/0016677 | A1* | 1/2014 | Dua | H04L 25/0216 |
| | | | | 375/148 |
| 2014/0219397 | A1* | 8/2014 | Chen | H04L 27/34 |
| | | | | 375/329 |
| 2015/0043629 | A1* | 2/2015 | Thompson | H04L 25/0212 |
| | | | | 375/232 |

OTHER PUBLICATIONS

3GPP TS 45.001 V9.0.0 (May 2009), 3rd Generation Partnership Project; Technical Specification Group GSM/EDGE Radio Access Network; Physical layer on the radio path . . . , pp. 43.

3GPP TS 45.002 V9.0.0 (May 2009), 3rd Generation Partnership Project; Technical Specification Group GSM/EDGE Radio Access Network; Multiplexing and multiple access . . . , pp. 105.

* cited by examiner

APPARATUS AND METHOD FOR SWITCHING BETWEEN RECEIVERS IN COMMUNICATION SYSTEM

PRIORITY

This application claims priority under 35 U.S.C. §119(a) to Korean Application Serial No. 10-2014-0162445, which was filed in the Korean Intellectual Property Office on Nov. 20, 2014, the contents of which are incorporated herein by reference.

BACKGROUND

1. Field of the Disclosure

The present disclosure relates generally to an apparatus and a method for switching between receivers according to a characteristic of a received signal in a communication system.

2. Description of the Related Art

The Global System for Mobile communications (GSM) is one of the most commonly known standards for voice and/or data. In the GSM network, voice and/or data is transmitted between a mobile station and a base station as a wireless signal through a physical channel which uses both frequency and time division multiplexing. Specifically, each frequency band (e.g., 200 kHz) is divided into frames having 8 time slots per frame. Depending on whether a voice code is half-rate or full-rate, one or two users are assigned to each time slot. Accordingly, a frequency band can support a maximum of 8 or 16 users corresponding to half-rate or full-rate.

GSM can use Gaussian Minimum Shift Keying (GMSK) modulation. Prior thereto, each symbol takes one of two values which are conventionally expressed as +1 and −1. After GMSK modulation, signals include complex-valued samples each having an In-phase (I) component and a Quadrature-phase (Q) component.

The number of GSM subscribers continues to dramatically increase, however, which causes a resource capacity problem to GSM operators. One recent initiative to increase the capacity of the GSM network is known as Voice services over Adaptive Multi-user channels on One Slot (VAMOS). The VAMOS initiative can double system capacity and can help to optimize spectrum efficiency and the use of scarce radio resources, while reducing the power consumption of a radio base station.

In the VAMOS initiative, a network assigns identical physical resources (i.e., a frequency band and a time slot) to two different mobile stations (e.g., a first MS and a second MS) in the downlink. Two mobile stations are assigned a training sequence pair which is an identical training sequence number from two training sequence sets (e.g., a first set and a second set) orthogonal to each other, and previously known to the two mobile stations. The network determines which of the two paired mobile stations should be assigned higher transmission power on the basis of, for example, the near-far position of the two paired mobile stations and uses an Adaptive Quadrature Phase Shift Keying (AQPSK) modulation technique to introduce power imbalance between the two paired mobile stations.

An optimal receiver for a GMSK modulated signal and that for an AQPSK modulated signal are typically different. The optimal receiver for the GMSK modulated signal is a Downlink Advanced Receiver Performance (DARP) receiver, to which only a training sequence of a desired user is known and external interference is unknown. In contrast, the optimal receiver for the AQPSK modulated signal is a Joint Detection (JD) receiver, to which both training sequences of paired users are known.

Although the DARP receiver is optional for a VAMOS-I signal, the JD receiver is compulsory for a VAMOS-II signal. The JD receiver has much better performance for the VAMOS-I signal than does the DARP receiver.

A direct method for detecting the modulation type of GMSK modulated signal and that of AQPSK modulated signal is to estimate a SubChannel Power Imbalance Ratio (SCPIR) between two users. A given SCPIR value of a GMSK modulated signal is infinite. In an AQPSK modulated signal, a given SCPIR value of a VAMOS-I signal and that of a VAMOS-II signal are in a range of −4 dB to 4 dB and in a range of −10 dB to 4 dB, respectively. When external interference is introduced and received power is low, the accuracy of an estimated SCPIR value dramatically degrades.

Accordingly, there is a need for a method which can efficiently select a receiver for accurately detecting a GMSK modulated signal or an AQPSK modulated signal, and can tolerate the interference and received power that are introduced by a signal received according to the conventional GSM system.

SUMMARY

The present disclosure has been made to address the above problems and disadvantages occurring in the prior art, and to provide at least the advantages set forth below.

Accordingly, an aspect of the present disclosure is to provide an apparatus and a method for switching between receivers according to a characteristic of a received signal in a communication system.

Another aspect of the present disclosure is to provide an apparatus and a method for switching to a receiver for accurately detecting a received signal in a communication system.

In accordance with an aspect of the present disclosure, an apparatus for switching between receivers in a communication system includes a radio frequency unit that modulates at least two signals received from transmission devices, and a Channel Impulse Response (CIR) shape comparison unit that determines characteristics of the modulated signals by using a CIR and selects a receiver according to the determined characteristics of the modulated signals.

In accordance with another aspect of the present disclosure, a method for switching between receivers in a communication system includes modulating at least two signals received from transmission devices, determining characteristics of the modulated signals by using a CIR, and selecting a receiver according to the determined characteristics of the modulated signals.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Hereinafter, embodiments of the present disclosure will be described in detail with reference to the accompanying drawings. In the following description, it should be noted that only portions required for comprehension of steps herein will be described. Descriptions of other portions will be omitted for the sake of clarity and conciseness.

The third Generation Partnership Project (3GPP) release 9 specifies a new GSM feature, referred to as VAMOS, in an effort to provide voice capacity enhancements. Since VAMOS may cancel a second VAMOS user, VAMOS may coexist with legacy terminals supporting DARP.

The 3GPP prescribes two Mobile Stations (MSs) supporting two levels for VAMOS. An MS supporting VAMOS needs to support a new set of GSM Training Sequence Codes (TSCs). VAMOS-I MSs, which use an SCPIR value ranging from 4 dB to −4 dB, are essentially DARP MSs updated to support a new VAMOS TSC set. VAMOS-II MSs, which use an SCPIR value ranging from −10 dB to 4 dB, need to be based on a more advanced receiver which may be a Joint Detection (JD) receiver. However, since the JD receiver has better performance than a DARP receiver in a VAMOS-I signal, a VAMOS-II MS may use the JD receiver for both a VAMOS-I signal and a VAMOS-II signal.

Meanwhile, in terms of voice quality the JD receiver is likely to have limited compatibility with the existing GSM voice services, which are GMSK modulated voice services. When only a GMSK modulated signal is transmitted, the JD receiver performs worse than the DARP receiver performs. In other words, when only a GMSK modulated signal is transmitted, the DARP receiver is the optimal receiver. There also exists a problem of compatibility between receivers when a VAMOS-II MS operates in a network which does not support VAMOS, when the VAMOS-II MS operates in a network supporting mixed VAMOS and legacy GMSK modulated services, and when the VAMOS-II MS operates in a VAMOS mode but a second user proceeds to a Discontinuous Transmission (DTX) state.

Accordingly, embodiments of the present disclosure provide an apparatus and a method which can accurately detect a modulation type of a received signal and consequently, enable an optimal receiver to be selected for the received signal in order to ensure optimal performance of an MS.

A description will now be made of a method for selecting a receiver by using an SCPIR value of a GMSK modulated signal and that of an AQPSK modulated signal. The SCPIR value is estimated on a burst-by-burst basis, and is typically used to switch between the JD receiver and the DARP receiver.

Figure 1A:
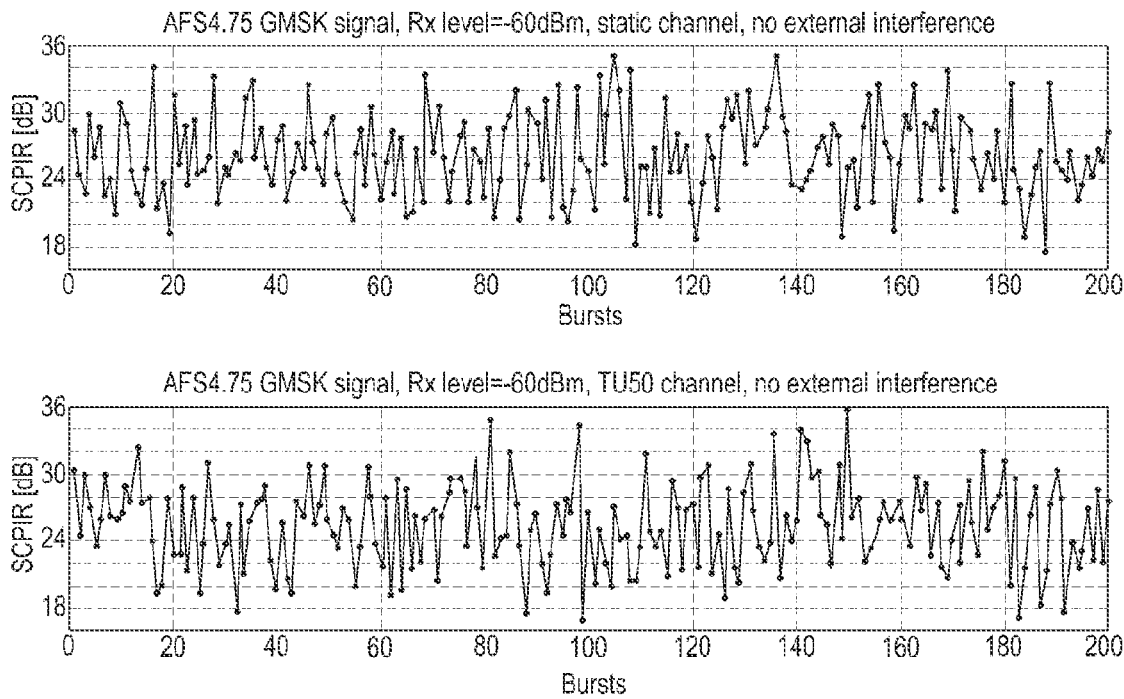
FIG. 1A illustrates an example of an SCPIR value of a GMSK modulated signal to which the present disclosure is applied.
Figure 1B:
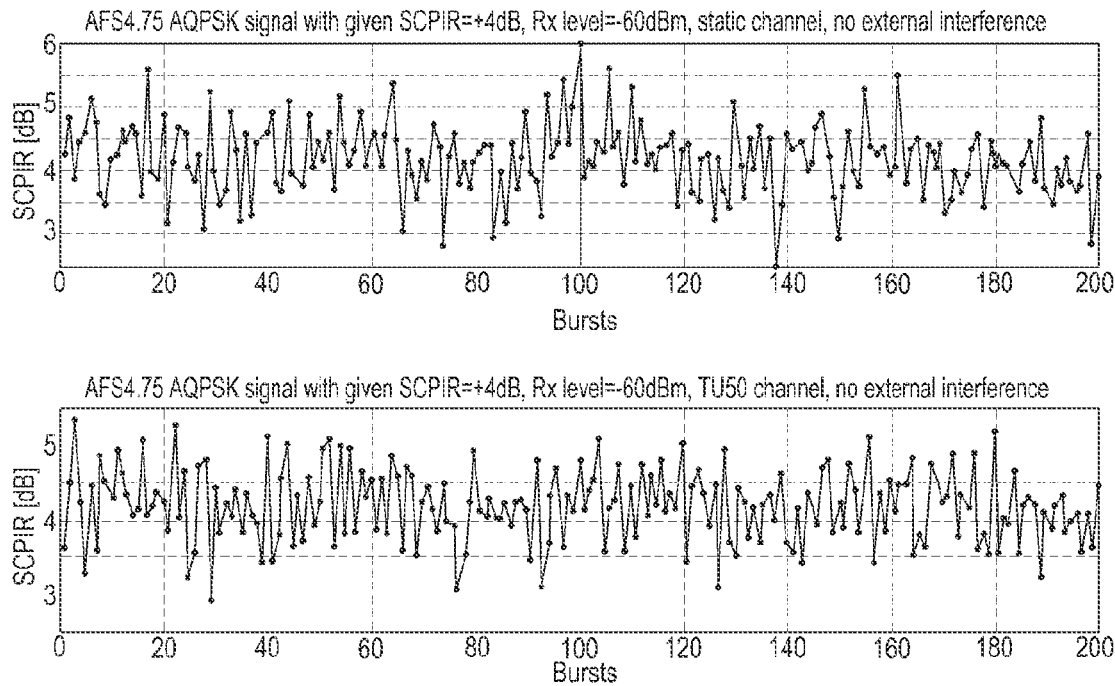
FIG. 1B illustrates an example of an SCPIR value of an AQPSK modulated signal to which the present disclosure is applied.

FIG. 1A illustrates an example of an SCPIR value of a GMSK modulated signal to which the present disclosure is applied, and FIG. 1B illustrates an example of an SCPIR value of an AQPSK modulated signal to which the present disclosure is applied.

FIG. 1A illustrates estimated SCPIR values in the dB scale of an AFS4.75 GMSK modulated signal in a static channel and a TU50 channel over 200 bursts when received power is equal to −60 dBm, which is good and there is no external interference. FIG. 1B illustrates estimated SCPIR values in the dB scale of an AFS4.75 AQPSK modulated signal in a static channel and a TU50 channel over 200 bursts when received power is equal to −60 dBm, which is good and there is no external interference. Under the conditions as illustrated in FIGS. 1A and 1B, the estimated SCPIR values of the GMSK modulated signal and those of the AQPSK modulated signal fall within a range of −4 dB to 4 dB and a range of −10 dB to 4 dB, respectively, and thus are very accurate.

Figure 2A:
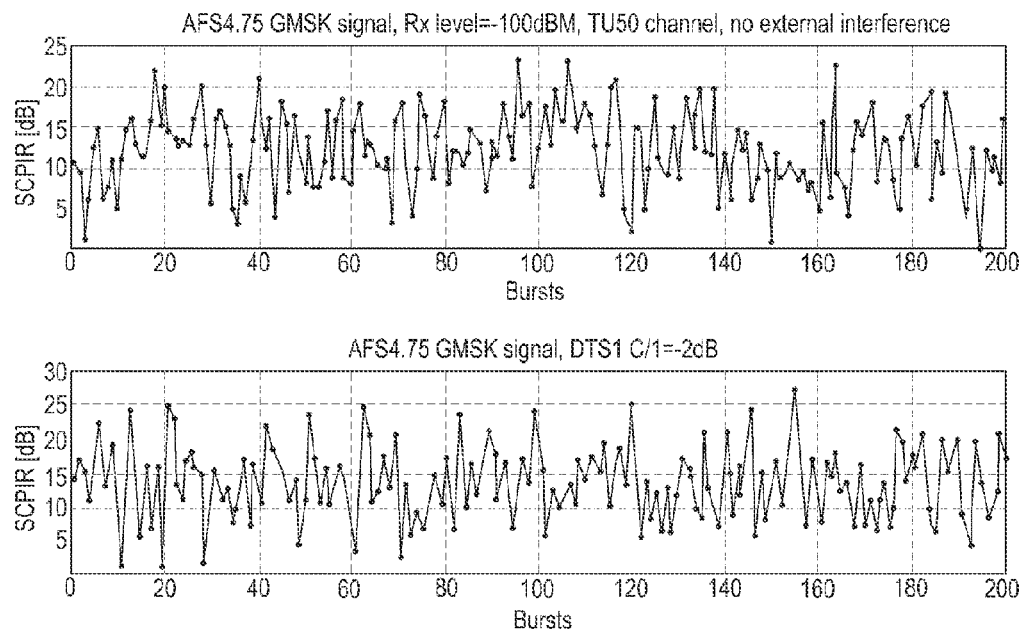
FIG. 2A illustrates another example of an SCPIR value of a GMSK modulated signal to which the present disclosure is applied.
Figure 2B:
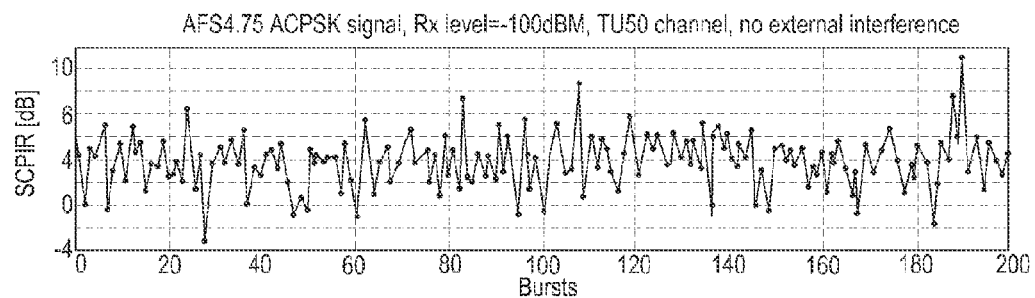
FIG. 2B illustrates another example of an SCPIR value of an AQPSK modulated signal to which the present disclosure is applied.
Figure 2B:
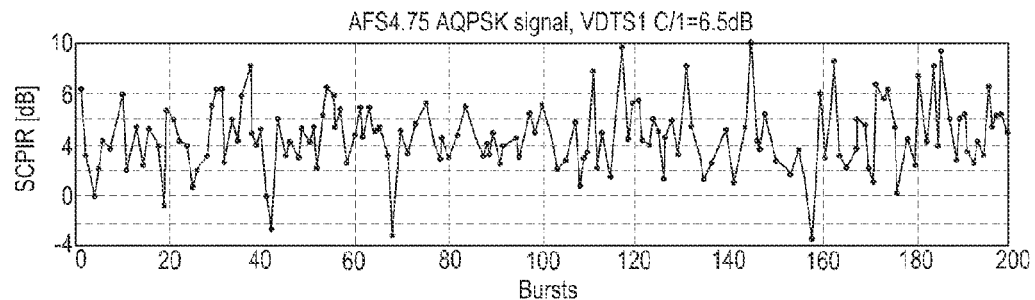

FIG. 2A illustrates another example of an SCPIR value of a GMSK modulated signal to which the present disclosure is applied, and FIG. 2B illustrates another example of an SCPIR value of an AQPSK modulated signal to which the present disclosure is applied.

FIG. 2A illustrates estimated SCPIR values in the dB scale of an AFS4.75 GMSK modulated signal over 200 bursts under a TU50 channel at a low power of −100 dBm without external interference and under a DTS1 (Downlink Advanced Receiver Performance (DARP) Test Scenario 1) condition C/I=−2 dB. FIG. 2B illustrates estimated SCPIR values in the dB scale of an AFS4.75 AQPSK modulated signal over 200 bursts under a TU50 channel at a low power of −100 dBm without external interference and under a VTDS1 (Voice services over Adaptive Multi-user channels on One Slot (VAMOS) downlink Advanced Receiver Performance (DARP) Test Scenario 1) condition C/I=6.5 dB.

Referring to FIGS. 2A and 2B, although a signal transmitted by a base station is a GMSK modulated signal having a given infinite SCPIR value, the estimated SCIR value may be reduced to 0 dB. In contrast, the estimated SCPIR value of an AQPSK modulated signal having a given SCPIR value of +4 dB may be increased up to at least 12 dB. A detection threshold does not exist, which ensures optimal detection of GMSK/AQPSK modulated signals. Accordingly, when switching is performed on the basis of only an SCPIR value, the performance of a receiver may be degraded due to incorrect selection.

Therefore, embodiments of the present disclosure provide an apparatus and a method which can accurately detect a modulation type of a received signal by using a different method from the conventional method which considers an SCPIR value, thereby enabling an optimal receiver to be selected for the received signal in order to ensure optimal performance of an MS.

Figure 3:
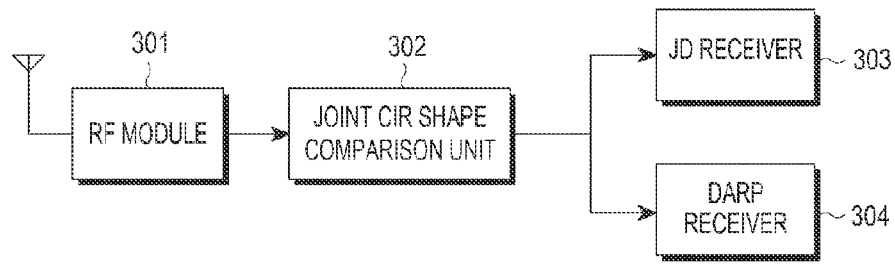
FIG. 3 illustrates a configuration of a receiving device that receives voice and/or data in a communication system according to an embodiment of the present disclosure.

FIG. 3 illustrates a configuration of a receiving device that receives voice and/or data in a communication system according to an embodiment of the present disclosure.

Referring to FIG. 3, a receiving device includes a Radio Frequency (RF) module 301, a joint Channel Impulse Response (CIR) shape comparison unit 302, a JD receiver 303, and a DARP receiver 304.

The RF module 301 receives at least two signals modulated from at least two transmission devices via one antenna.

The joint CIR shape comparison unit 302 corresponds to the apparatus for switching between receivers described herein. Particularly, the joint CIR shape comparison unit 302 receives the modulated signals delivered by the RF module 301, jointly estimates joint CIRs of the modulated signals, and normalizes each of the estimated signals by applying a weighted Finite Impulse Response (FIR) filter to each of the estimated signals. The joint CIR shape comparison unit 302 then selects the JD receiver 303 or the DARP receiver 304 on the basis of a difference between the normalized signals. In FIG. 3, the joint CIR shape comparison unit 302 is located after the RF module 301. Accordingly, the JD receiver 303 and the DARP receiver 304 may share the identical RF module, but may have differences in their baseband processing.

Figure 4:
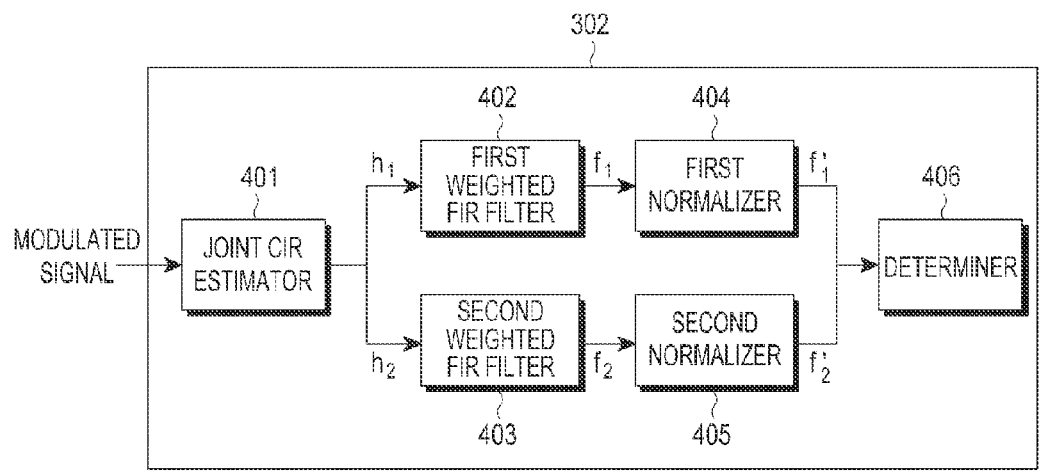
FIG. 4 illustrates a detailed configuration of a joint CIR shape comparison unit (indicated by reference numeral 302) illustrated in FIG. 3 according to an embodiment of the present disclosure.

FIG. 4 illustrates a detailed configuration of a joint CIR shape comparison unit, indicated by reference numeral 302 in FIGS. 3 and 4, according to an embodiment of the present disclosure. FIG. 4 illustrates, as an example, the detailed configuration of the joint CIR shape comparison unit 302 in receiving two signals through the RF module 301 from two transmission devices via one antenna. However, the number of subunits included in the joint CIR shape comparison unit 302 may depend on the number of received signals.

Referring to FIG. 4, the joint CIR shape comparison unit 302 includes a joint CIR estimator 401, a first weighted FIR filter 402, a second weighted FIR filter 403, a first normalizer 404, a second normalizer 405, and a determiner 406.

The joint CIR estimator 401 receives modulated signals delivered by the RF module 301. The joint CIR estimator 401 then jointly estimates CIRs of the modulated signals by using Equation (1) below. Specifically, the joint CIR estimator 401 outputs a signal $h_1$ and a signal $h_2$ by using Equation (1), as follows:

$$\begin{bmatrix} h_1 \\ h_2 \end{bmatrix} = \left[ ([A_1 \mid A_2]^H [A_1 \mid A_2])^{-1} [A_1 \mid A_2]^H \right] r \quad (1)$$

In Equation (1), H represents a conjugate transpose of a matrix, r represents modulated signals which are input to the joint CIR estimator 401, and A1 and A2 represent toeplitz matrices of Training Sequence Codes (TSCs) of two MSs. Since TSC numbers of TSC sets are previously known to a transmission device (i.e., an MS), A1 and A2 may be constructed as expressed in Equation (2), as follows:

$$A_1 = \begin{bmatrix} a_1[K-1] & a_1[K-2] & \ldots & a_1[0] \\ a_1[k] & a_1[K-1] & \ldots & a_1[1] \\ \vdots & \vdots & \ddots & \vdots \\ a_1[N-1] & a_1[N-2] & & a_1[N-K] \end{bmatrix} \quad (2)$$

$$A_2 = \begin{bmatrix} a_2[K-1] & a_2[K-2] & \ldots & a_2[0] \\ a_2[k] & a_2[K-1] & \ldots & a_2[1] \\ \vdots & \vdots & \ddots & \vdots \\ a_2[N-1] & a_2[N-2] & & a_2[N-K] \end{bmatrix};$$

In Equation (2), K represents the length of a tap of a CIR or a tap number thereof, and N represents the length of a TSC.

The first weighted FIR filter 402 and the second weighted FIR filter 403 use respective weighted FIR filters both having identical coefficients denoted as w. Specifically, the first weighted FIR filter 402 applies a weighted FIR filter denoted as w to the signal $h_1$, and the second weighted FIR filter 403 applies a weighted FIR filter denoted as w to the signal $h_2$. The length of w is equal to K representing the length of a CIR. Since power is not allocated equally to all CIR taps and a tailing tap typically includes noise, weighted FIR filters are designed to amplify a CIR tap allocated high power and eliminate the impact of the tailing tap. In embodiments of the present disclosure, there is no limitation to the design of a weighted FIR filter.

Specifically, the first weighted FIR filter 402 and the second weighted FIR filter 403 output $f_1$ and $f_2$ from a dot product between each tap of a signal $h_1$ and each tap of w and a dot product between each tap of a signal $h_2$ and each tap of w, respectively, as expressed in Equation (3), as follows.

$$f_1[k] = h_1[k] * w[k] \text{ where } k=0 \ldots K-1$$

$$f_2[k] = h_2[k] * w[k] \text{ where } k=0 \ldots K-1 \quad (3)$$

The first normalizer 404 and the second normalizer 405 receive $f_1$ and $f_2$ delivered by the first weighted FIR filter 402 and the second weighted FIR filter 403, respectively. The first normalizer 404 and the second normalizer 405 then eliminate the negative impact of received power of $f_1$ and that of $f_2$, respectively, by using Equation (4), as follows:

$$f'_1[k] = f_1[k] \Big/ \max_k(f_1[k]) \quad (4)$$

$$f'_2[k] = f_2[k] \Big/ \max_k(f_2[k])$$

The determiner 406 accumulates (as indicated by s) absolute values of a difference between each tap of a signal f'$_1$ and that of a signal f'$_2$ as expressed below in Equation (5), and compares s representing the accumulated value with a predetermined threshold. In Equation (5), as follows, the accumulated value s is a difference value between a GMSK modulated signal and an AQPSK modulated signal. As an example, a difference value between a GMSK modulated signal and an AQPSK modulated signal may be illustrated in FIGS. 5A and 5B.

$$s = \sum_{k=0}^{K-1} |f'_1[k] - f'_2[k]| \quad (5)$$

Figure 5A:
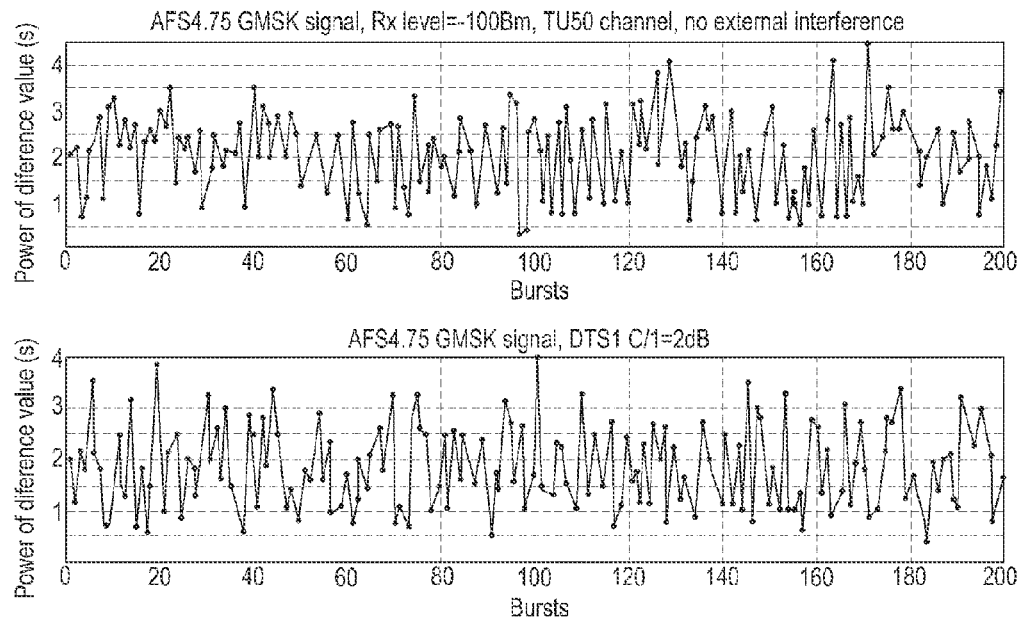
FIGS. 5A and 5B illustrate an example of a difference value between a GMSK modulated signal and an AQPSK modulated signal over 200 bursts according to an embodiment of the present disclosure.
Figure 5B:
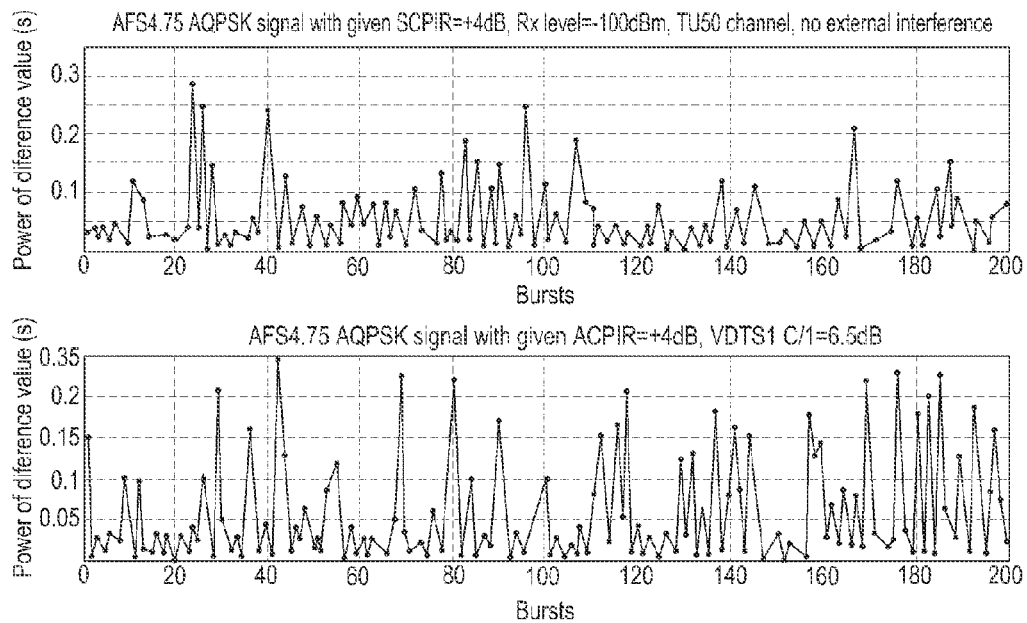

FIGS. 5A and 5B each illustrate an example of a difference value between a GMSK modulated signal and an AQPSK modulated signal over 200 bursts, to which the present disclosure is applied.

When the threshold ranges between 0.3 and 0.4 as a result of the simulation illustrated in FIGS. 5A and 5B, the accuracy of the detection of GMSK/AQPSK modulated signals may be 100%. Accordingly, the method for switching between receivers, according to an embodiment of the present disclosure, may accurately detect a modulated signal without depending on an SCPIR value and received power. In other words, the method for switching between receivers, according to an embodiment of the present disclosure, is not affected by external interference and received power.

When the accumulated value is greater than or equal to the predetermined threshold, the determiner 406 determines that the received signal is a GMSK modulated signal, and delivers the received signal to the DARP receiver 304. In contrast, when the accumulated value is less than the predetermined threshold, the determiner 406 determines that the received signal is an AQPSK modulated signal, and delivers the received signal to the JD receiver 303.

Figures 6A, 6B, 6C:
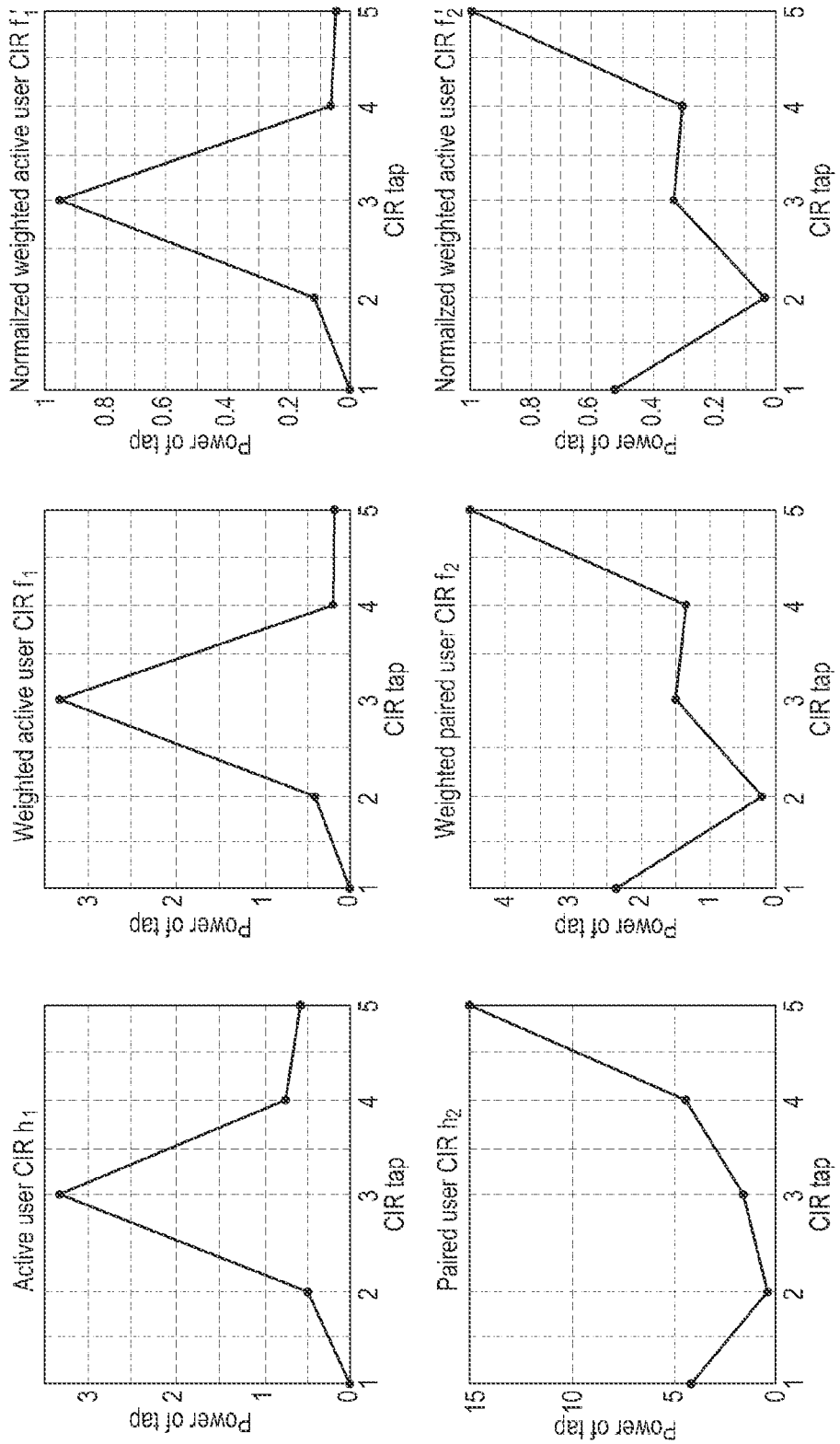
FIGS. 6A-6C and 7A-7C illustrate signal waveforms which are output from an output terminal of a joint CIR shape comparison unit according to an embodiment of the present disclosure.

FIGS. 6A-6C illustrate signal waveforms which are output from an output terminal of the joint CIR shape comparison unit 302, when a modulated signal which has been input to the joint CIR shape comparison unit 302 is an AFS4.75 (Adaptive Full-Rate Speech 4.75 Gaussian Minimum Shift Keying) GMSK modulated signal under DTS1 condition C/I=−2 dB.

Referring to FIGS. 6A-6C, when receiving modulated signals as input from the RF module 301, the joint CIR estimator 401 jointly estimates CIRs of the modulated signals, and outputs waveforms of signals (i.e., a signal $h_1$ and a signal $h_2$) illustrated in FIG. 6A. When the first weighted FIR filter 402 and the second weighted FIR filter 403 receive the signal $h_1$ and the signal $h_2$ as input, respectively, the first weighted FIR filter 402 applies a weighted FIR filter denoted as w to the signal $h_1$, and the second weighted FIR filter 403 applies a weighted FIR filter denoted as w to the signal $h_2$. The first weighted FIR filter 402 and the second weighted FIR filter 403 then output waveforms of signals (i.e., a signal $f_1$ and a signal $f_2$) illustrated in FIG. 6B, respectively. When the first normalizer 404 and the second normalizer 405 receive the signal $f_1$ and the signal $f_2$ as input, respectively, the first normalizer 404 and the second normalizer 405 normalize the signal $f_1$ and the signal $f_2$, and output waveforms of signals (i.e., a signal $f_1'$ and a signal $f_2'$) illustrated in FIG. 6C, respectively.

Figures 7A, 7B, 7C:
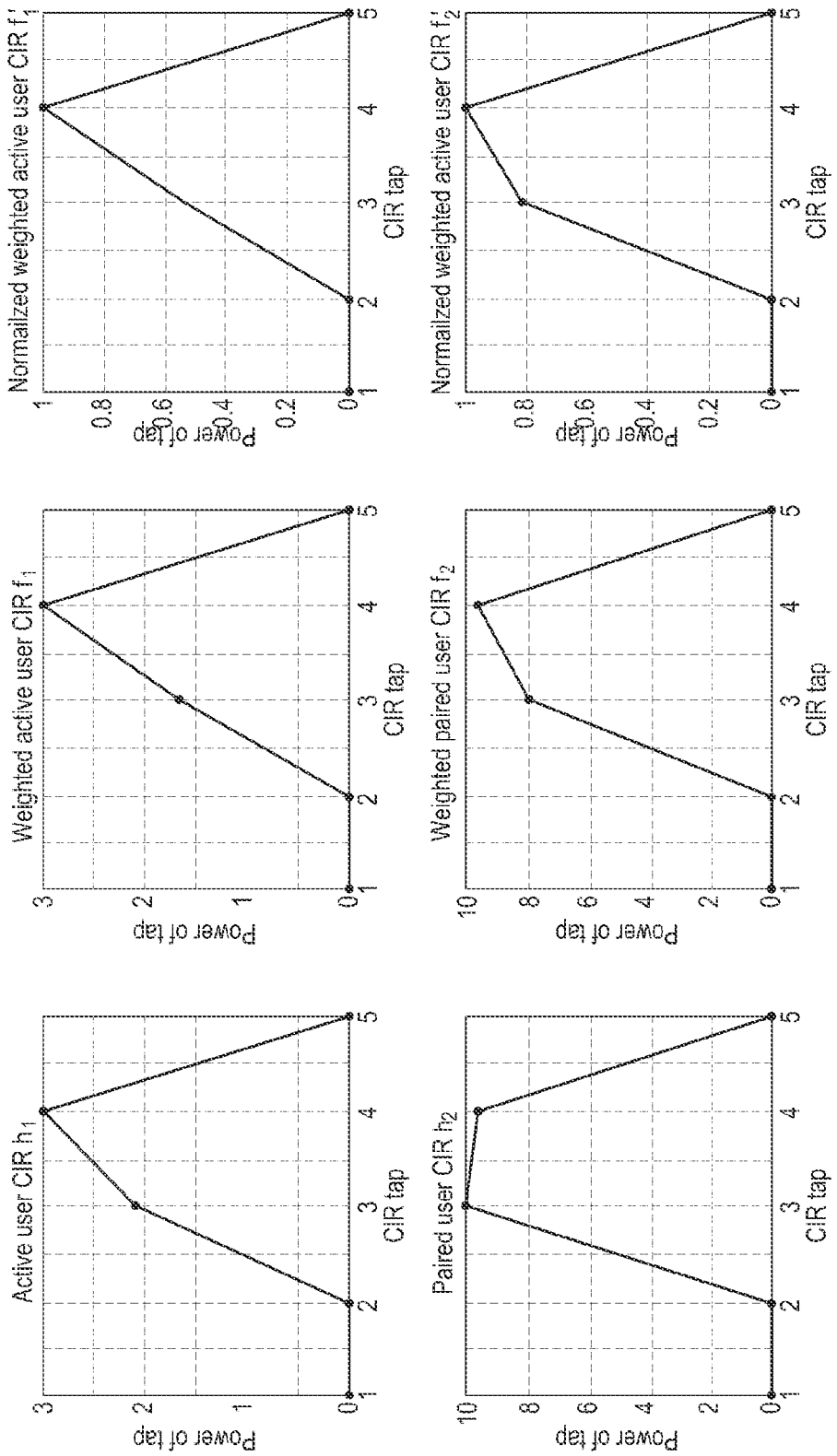

FIGS. 7A-7C illustrates signals which are output from an output terminal of the joint CIR shape comparison unit 302, when a modulated signal which has been input to the joint CIR shape comparison unit 302 is an AQPSK modulated signal having a given SCPIR of +4 dB.

Referring to FIGS. 7A-7C, when receiving modulated signals as input from the RF module 301, the joint CIR estimator 401 jointly estimates CIRs of the modulated signals, and outputs waveforms of signals (i.e., a signal $h_1$ and a signal $h_2$) illustrated in FIG. 7A. When the first weighted FIR filter 402 and the second weighted FIR filter 403 receive the signal $h_1$ and the signal $h_2$ as input, respectively, the first weighted FIR filter 402 applies a weighted FIR filter denoted as w to the signal $h_1$, and the second weighted FIR filter 403 applies a weighted FIR filter denoted as w to the signal $h_2$. Then, the first weighted FIR filter 402 and the second weighted FIR filter 403 output waveforms of signals (i.e., a signal $f_1$ and a signal $f_2$) illustrated in FIG. 7B, respectively.

When the first normalizer 404 and the second normalizer 405 receive the signal $f_1$ and the signal $f_2$ as input, respectively, the first normalizer 404 and the second normalizer 405 normalize the signal $f_1$ and the signal $f_2$, and output waveforms of signals (i.e., a signal $f_1'$ and a signal $f_2'$) illustrated in FIG. 7C, respectively.

Referring to FIGS. 6A-6B and FIGS. 7A-7C, when a modulated signal is a GMSK modulated signal, CIRs of two modulated signals have completely different shapes. In contrast, when a modulated signal is an AQPSK modulated signal, although severe external interference is introduced, CIRs of MSs, which transmit two modulated signals, have similar shapes.

Figure 8:
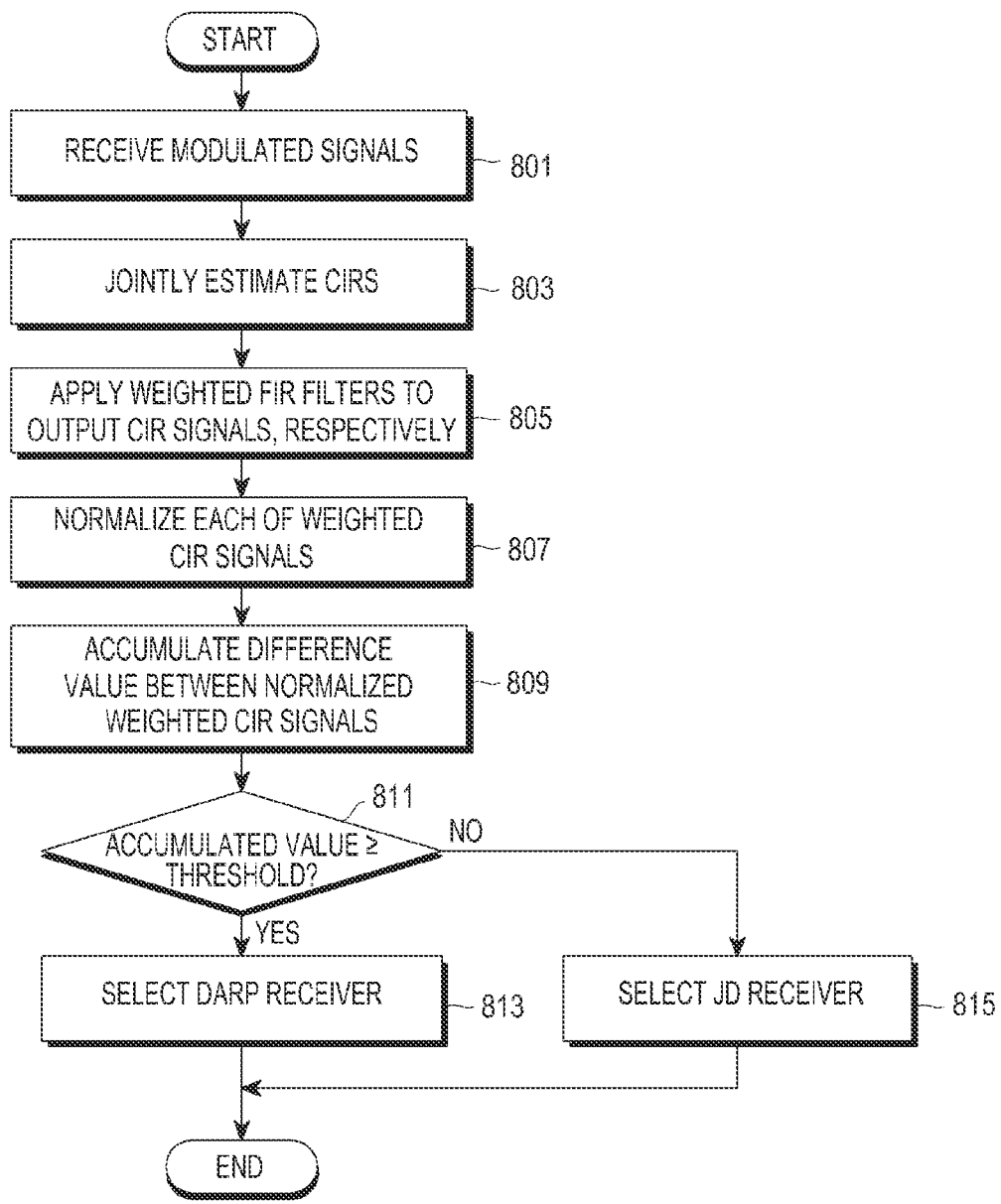
FIG. 8 illustrates a method for switching between receivers according to embodiment of the present disclosure.

FIG. 8 illustrates a method for switching between receivers according to embodiment of the present disclosure. Referring to FIG. 8, in step 801, the joint CIR shape comparison unit 302 receives modulated signals from the RF module 301. In step 803, the joint CIR shape comparison unit 302 jointly estimates CIRs of the modulated signals, and outputs a signal $h_1$ and a signal $h_2$. In step 805, the joint CIR shape comparison unit 302 applies weighted FIR filters both having identical coefficients denoted as w to the signal $h_1$ and the signal $h_2$, and outputs a signal $f_1$ and a signal $f_2$, respectively.

In step 807, the joint CIR shape comparison unit 302 separately normalizes the signal $f_1$ and the signal $f_2$, and outputs a signal $f'_1$ and a signal $f'_2$ which are obtained by eliminating the negative impact of received power of the signal $f_1$ and that of the signal $f_2$, respectively. In step 809, the joint CIR shape comparison unit 302 accumulates absolute values of a difference between the signal $f'_1$ and the signal $f'_2$. In step 811, the joint CIR shape comparison unit 302 compares the accumulated value with a predetermined threshold. When the accumulated value is greater than or equal to the predetermined threshold as a result of the comparison, in step 813, the joint CIR shape comparison unit 302 selects a DARP receiver. In contrast, when the accumulated value is less than the predetermined threshold, in step 815, the joint CIR shape comparison unit 302 selects a JD receiver.

While the present disclosure has been shown and described with reference to certain embodiments thereof, it will be understood by those skilled in the art that various changes in form and details may be made therein without departing from the scope of the present disclosure. Thus, the scope of the present disclosure shall not be determined merely based on the described embodiments, but rather, based on the accompanying claims and the equivalents thereto.

What is claimed is:

1. An apparatus for switching between receivers in a communication system, the apparatus comprising:
   an antenna module configured to receive at least two modulated signals received from transmission devices; and
   a channel impulse response (CIR) shape comparison unit configured to determine characteristics of the modulated signals by using a CIR, and select a receiver according to the determined characteristics of the modulated signals,
   wherein the CIR shape comparison unit comprises:
   a CIR estimator configured to estimate CIRs of the modulated signals and output at least two output signals,
   a filter configured to apply weighted filters having identical weighting coefficients to the at least two output signals, respectively, and output at least two weighted signals, and
   a determiner configured to accumulate absolute values of a difference between the at least two weighted signals, select a first receiver if the accumulated difference value is greater than or equal to a predetermined threshold, and select a second receiver if the accumulated difference value is less than the predetermined threshold.

2. The apparatus as claimed in claim 1, wherein the first receiver is a downlink advanced receiver performance (DARP) receiver, and the second receiver is a joint detection (JD) receiver.

3. The apparatus as claimed in claim 2, wherein the CIR shape comparison unit further comprises a normalizer configured to normalize each of the at least two weighted signals.

4. The apparatus as claimed in claim 1, wherein the weighted filter corresponds to a finite impulse response (FIR) filter.

5. The apparatus as claimed in claim 2, wherein the predetermined threshold has a value within a range of 0.3 to 0.4.

6. The apparatus as claimed in claim 2, wherein the CIR estimator is further configured to output the at least two output signals by using $$\begin{bmatrix} h_1 \\ h_2 \end{bmatrix} = \left[ ([A_1 \mid A_2]^H [A_1 \mid A_2])^{-1} [A_1 \mid A_2]^H \right] r,$$

wherein H represents a conjugate transpose of a matrix, $h_1$ and $h_2$ represent the at least two output signals, r represents the modulated signals, and $A_1$ and $A_2$ represent toeplitz matrices of two mobile stations.

7. The apparatus as claimed in claim 1, wherein the filter is further configured to apply weighted filters all having identical weighting coefficients to the at least two output signals, respectively, and output the at least two weighted signals by using $f_1[k] = h_1[k] * w[k]$ where $k = 0 \ldots K-1$ $f_2[k] = h_2[k] * w[k]$ where $k = 0 \ldots K-1$, wherein K represents a length of the CIR that is an integer greater than 1, $h_1$ and $h_2$ represent the at least two output signals, w represents the weighting coefficients, and $f_1$ and $f_2$ represent the at least two weighted signals.

8. The apparatus as claimed in claim 3, wherein the normalizer is further configured to normalize the at least two weighted signals and output at least two normalized weighted signals by using $$f'_1[k] = f_1[k] \Big/ \max_k (f_1[k])$$

$$f'_2[k] = f_2[k] \Big/ \max_k (f_2[k]),$$

wherein $k = 0 \ldots K-1$, $f_1$ and $f_2$ represent the at least two weighted signals, $f'_1$ and $f'_2$ represent the at least two normalized weighted signals, and K is an integer greater than 1.

9. A method for switching between receivers in a communication system, the method comprising:
receiving at least two modulated signals received from transmission devices;
estimating channel impulse responses (CIRs) of the modulated signals, and outputting at least two output signals;
applying weighted filters having identical weighting coefficients to the at least two output signals, respectively, and outputting at least two weighted signals;
accumulating absolute values of a difference between the at least two weighted signals;
selecting a first receiver if the accumulated difference value is greater than or equal to a predetermined threshold; and
selecting a second receiver if the accumulated difference value is less than the predetermined threshold.

10. The method as claimed in claim 9, wherein selecting the first receiver comprises selecting a downlink advanced receiver performance (DARP) receiver if the accumulated difference value is greater than or equal to the predetermined threshold, and
wherein selecting the second receiver comprises selecting a joint detection (JD) receiver if the accumulated difference value is less than the predetermined threshold.

11. The method as claimed in claim 9, further comprising normalizing each of the at least two weighted signals.

12. The method as claimed in claim 10, wherein the weighted filter corresponds to a finite impulse response (FIR) filter.

13. The method as claimed in claim 10, wherein the predetermined threshold has a value within a range of 0.3 to 0.4.

14. The method as claimed in claim 9, wherein the at least two output signals are output by using $$\begin{bmatrix} h_1 \\ h_2 \end{bmatrix} = \left[ ([A_1 \mid A_2]^H [A_1 \mid A_2])^{-1} [A_1 \mid A_2]^H \right] r,$$

wherein H represents a Hermian matrix, $h_1$ and $h_2$ represent the at least two output signals, r represents the modulated signals, and $A_1$ and $A_2$ represent toeplitz matrices of two mobile stations.

15. The method as claimed in claim 9, wherein outputting the at least two weighted signals comprises applying weighted filters all having identical weighting coefficients to the at least two output signals, respectively, and outputting the at least two weighted signals by using $f_1[k] = h_1[k] * w[k]$ where $k = 0 \ldots K-1$ $f_2[k] = h_2[k] * w[k]$ where $k = 0 \ldots K-1$, wherein K represents a length of the CIR that is an integer greater than 1, $h_1$ and $h_2$ represent the at least two output signals, w represents the weighting coefficients, $f_1$ and $f_2$ represent the at least two weighted signals, and K is an integer greater than 1.

16. The method as claimed in claim 11, wherein normalizing each of the at least two weighted signals comprises normalizing the at least two weighted signals and outputting at least two normalized weighted signals by using $$f'_1[k] = f_1[k] \Big/ \max_k (f_1[k])$$

$$f'_2[k] = f_2[k] \Big/ \max_k (f_2[k]),$$

wherein $k = 0 \ldots K-1$, $f_1$ and $f_2$ represent the at least two weighted signals, $f'_1$ and $f'_2$ represent the at least two normalized weighted signals, and K is an integer greater than 1.

* * * * *